United States Patent [19]

Mathison et al.

[11] Patent Number: 4,817,671
[45] Date of Patent: Apr. 4, 1989

[54] HIGH PRESSURE MECHANICAL PLUG DEVICE

[75] Inventors: Allen D. Mathison, Richfield; Dale K. Nelson, Minneapolis, both of Minn.

[73] Assignee: Cherne Industries, Inc., Minneapolis, Minn.

[21] Appl. No.: 146,342

[22] Filed: Jan. 21, 1988

[51] Int. Cl.$^4$ ............................................. F16L 55/10
[52] U.S. Cl. ........................................ 138/89; 138/90
[58] Field of Search ............................ 138/89, 90, 93; 220/233, 234, 235, 236, 237, 238

[56] References Cited

U.S. PATENT DOCUMENTS

| | | | |
|---|---|---|---|
| 577,811 | 2/1897 | Tadder | 166/133 |
| 1,560,489 | 11/1925 | Yager | 138/89 |
| 1,867,559 | 7/1932 | Beck | 138/89 |
| 1,985,787 | 12/1934 | Bourveau | 138/89 |
| 2,010,200 | 8/1935 | Rufener et al. | 138/89 |
| 2,776,015 | 1/1957 | Bielstein | 138/89 |
| 3,042,116 | 7/1962 | Sharp | 166/179 |
| 3,291,156 | 10/1963 | Corsano | 138/89 |
| 3,593,749 | 7/1971 | Reardon | 138/93 |
| 3,667,640 | 6/1972 | Morrow | 220/24.5 |
| 3,886,977 | 6/1975 | Dorgebray | 138/89 |
| 3,942,560 | 3/1976 | Deaver | 138/89 |
| 3,978,892 | 9/1976 | Scodino | 138/89 |
| 3,983,904 | 10/1976 | Laviano | 138/89 |
| 4,262,702 | 4/1981 | Streich | 138/89 |
| 4,381,800 | 5/1983 | Leslie | 138/90 |
| 4,493,344 | 1/1985 | Mathison | 138/89 |
| 4,611,485 | 9/1986 | Leslie | 73/49.8 |

OTHER PUBLICATIONS

Anderson and Grunsky Product Brochure, 10/1986, Anderson Test Plugs.
Expando Seal Tools, Inc., 6/1986, Vibra-Proof Condenser Plugs, Flange Test Plug, Pop-A-Plug System (Product Brochure).
Mechanical Research & Design Corporation Product Brochure, 3/1987, Sealfast.
Thaxton, Inc., Product Brochure, 12/1987, High Pressure Pipe Stoppers.
Tube Turns Product Brochure, 12/1987, Swel-Plug.
T. D. Williamson Product Brochure, 1/1980, Wedge-Lock Pipe Plug.

*Primary Examiner*—James E. Bryant, III
*Attorney, Agent, or Firm*—Anthony G. Eggink

[57] ABSTRACT

A high pressure mechanical plug device for sealing and locking into a high interior pressure pipeline. The mechanical plug device has a hollow cylindrical body structure with an end wall and a side wall structure having a plurality of apertures. A piston structure having an end wall and a frustoconical ram of a predetermined slope is provided for movement in the cylindrical body structure. An elastomeric sealing member is in communication with the end wall of the piston structure. A plurality of rigid securement members are provided for extension through the apertures of the cylindrical body structure and for slidingly engaging the frustoconical ram. A draw bolt extending axially from the frustoconical ram through the end wall of the cylindrical body is provided with a nut to move the piston structure into the cylindrical body to seal and lock the plug device in the pipeline.

27 Claims, 4 Drawing Sheets

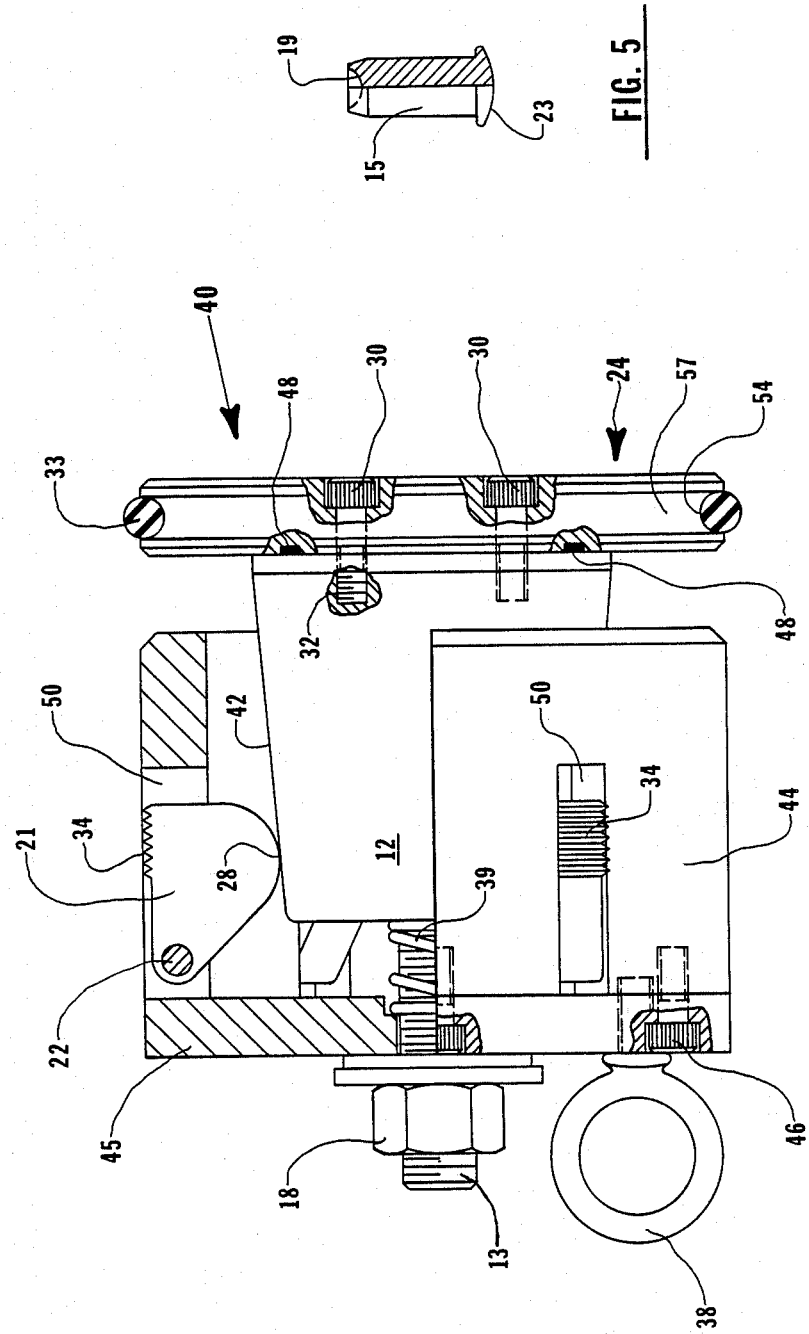

HIGH PRESSURE MECHANICAL PLUG DEVICE

BACKGROUND OF THE INVENTION

This invention relates to a mechanical plug device to seal the interior of a pipeline. Particularly, this invention relates to a high pressure mechanical plug to internally seal and lock into pipelines having high internal pressures of up to approximately 1,000 p.s.i.

High pressure mechanical plug devices of this invention are useful to plug pipelines for testing and repair purposes. These high pressure mechanical plugs are particularly useful in such high pressure applications as in high pressure water pipelines, steam lines, petroleum and chemical lines as in commercial applications as in power plants. The mechanical plugs of this invention permit users to quickly and efficiently seal and plug high pressure pipelines such as steel pipes ranging in diameter from 1.5 to 18 inches. Additionally, the mechanical plug devices of the invention are constructed and arranged so that the internal pressure of the pipeline acts on the device structures to aid them in mechanically locking into the pipeline.

Although prior art mechanical plug devices have been proposed or developed for sealing pipelines, their respective structures have been limited to specific pipeline conditions. For example, U.S. Pat. No. 4,493,344 developed by the Applicants of this invention discloses a mechanical plug device for use in sealing relatively low pressure pipelines. Varying device structures have also been disclosed by others to seal pipelines having relatively low pressure environmental conditions.

The high pressure mechanical plug devices of this invention provide plug structures which function to both seal and mechanically seat or lock into pipelines having high internal pressures. And as far as is known, no such mechanical plug devices have heretofore been developed or proposed.

SUMMARY OF THE INVENTION

This invention provides a high pressure mechanical plug device for sealing and locking into a pipeline having a high interior pressure. The device has a top plate structure with a circular cross section and a generally hollow interior. The top plate structure further has a plurality of apertures therethrough at predetermined locations.

The mechanical plug device is further provided with a bottom plate structure having a circular cross section and a downwardly sloping ram section with a threaded draw bolt extending from its central axis on its opposite end. An elastomeric and circular sealing member is provided to engage one of the plate structures to seal the interior of the pipeline.

In one embodiment of the device, the bottom and top plate structures have opposing beveled end portions to engage a sealing ring having an inner V-shaped bottom surface. In another embodiment, one of the plate structures has an outer circumferential groove to receive a compression ring to seal against the interior pipeline wall.

A plurality of securement members are provided to ride on the sloping ram section surface and which are constructed to extend through the apertures in the top plate structure. Means to move the bottom plate structure toward the top plate structure is provided whereby the movement of the plate structures causes the V-shaped, elastomeric sealing member to expand outwardly on the plate structures' opposing beveled end portions and simultaneously causing the rigid securement members to extend through the top plate apertures to engage the interior wall of the pipeline to mechanically secure or lock the plug device. Thus, the predetermined angles of the V-shaped sealing rings and that of the sloping ram section cooperate to cause the mechanical plug device to seal against the interior pipeline wall and then to lock the plug device in place.

Also provided by this invention are alternative bottom plate structures and configurations with sloping ram sections having a Predetermined slope range. Also provided by the invention are mechanical securement member arrangements and configurations comprised of locking pins and toothed cam structures to effectuate the mechanical seating or locking of the device into a pipeline.

These and other benefits of this invention will become clear from the following description, by reference to the drawings.

BRIEF DESCRIPTION OF THE DRAWINGS

FIG. 4 is a lateral plan view with cut-away portions showing an alternative embodiment of the mechanical plug device of this invention; and FIG. 5 is a lateral plan view showing the locking pins used in the high pressure mechanical plugs of this invention.

DESCRIPTION OF THE PREFERRED EMBODIMENTS

Figure 1:
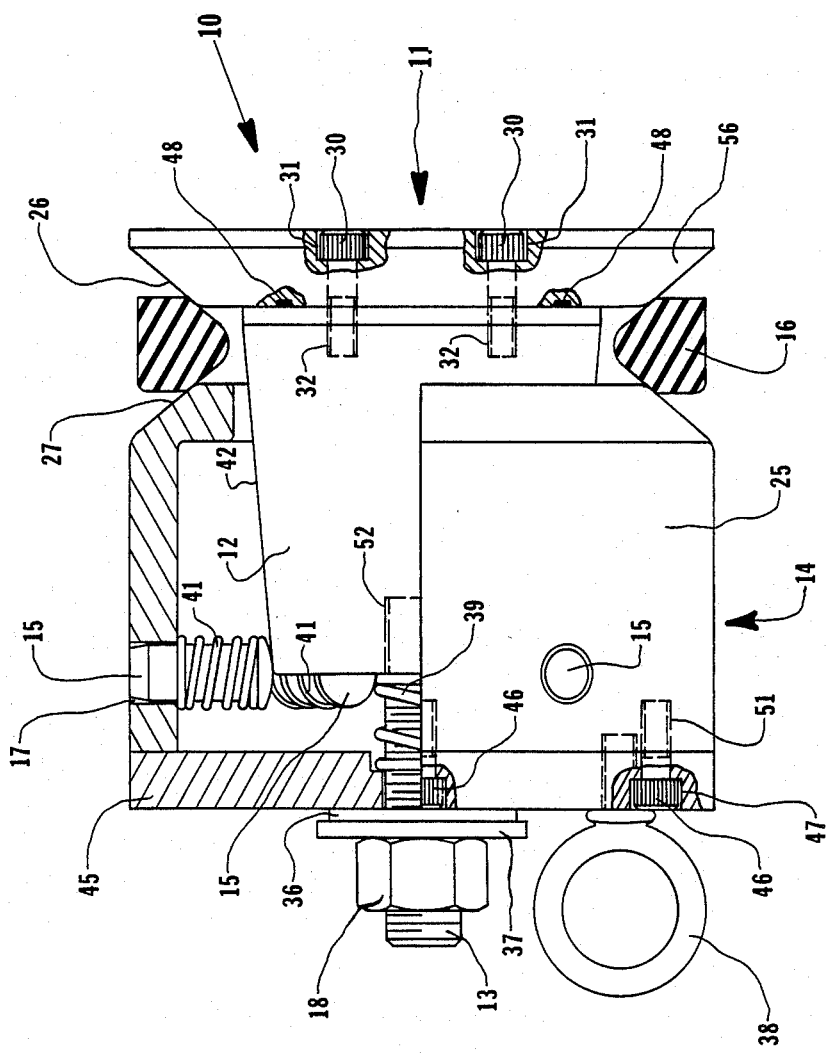
FIG. 1 is a lateral plan view of the high pressure mechanical plug of this invention with cutaway portions showing the elements comprising the mechanical plug device.

Referring to FIG. 1, the mechanical plug 10 is there shown as having a bottom plate structure 11 and a top plate or cylindrical body structure 14 between which an elastomeric O-ring 16 is expanded to seal a pipeline. The bottom plate 11 structure has a circumferential sloped surface 26 and the top plate structure 14 has an opposing sloped surface 27. The opposing sloped surfaces 26 and 27 provide frustoconical surfaces on the outer ends of the bottom and top plate structures 11 and 14.

An elastomeric O-ring 16 is seated on the opposing sloped surfaces 26 and 27 whereby the bringing together of the surfaces 26 and 27 causes the elastomeric O-ring 16 to be squeezed outwardly to engage and seal the interior wall of a pipeline.

The bottom plate structure 11 has an end wall 56 which is attached to a ram section 12 by means of machine screws 30 which are placed into apertures 31 and tightened into the threaded apertures 32 of ram section 12. A sealing ring 48 is provided between the end wall 56 and the ram section 12 to prevent possible leakage between the mating surfaces of the end wall 56 bottom plate structure 11 and the ram section 12.

The top structure 14 is shown to have two body elements, namely, a hollow, cylindrical body 25 having a circumferential sloped surface 27 at one end and an end plate structure 45 at its opposite end. The end plate 45 abuts the cylindrical body 25 and is held in place by machine screws 46 which are placed in apertures 47 and into the threaded apertures 51 of cylindrical body 25. The end plate 45 further has an eye bolt 38 as a tethering means for the plug device 10.

The ram 12 is generally a solid metallic structure having a downwardly sloping surface 42 of a predetermined angle. Extending centrally and axially from the ram 12 is a draw bolt 13 which extends through a centrally disposed aperture 53 in the end plate 45. The draw bolt 13 is shown fixed in a centrally disposed aperture 52 of the frustoconical ram 12.

A nut 18 is provided to thread onto the draw bolt 13. The nut 18, when tightened, causes the bottom plate structure 11 to move towards and into the top plate structure 14. Between the nut 18 and the end plate 45 of the top plate structure 14 are a low friction washer 36 and a thrust washer 37. The low friction washer 36 is preferably constructed of bronze and the thrust washer 37 is preferably of a steel construction.

Figure 3:
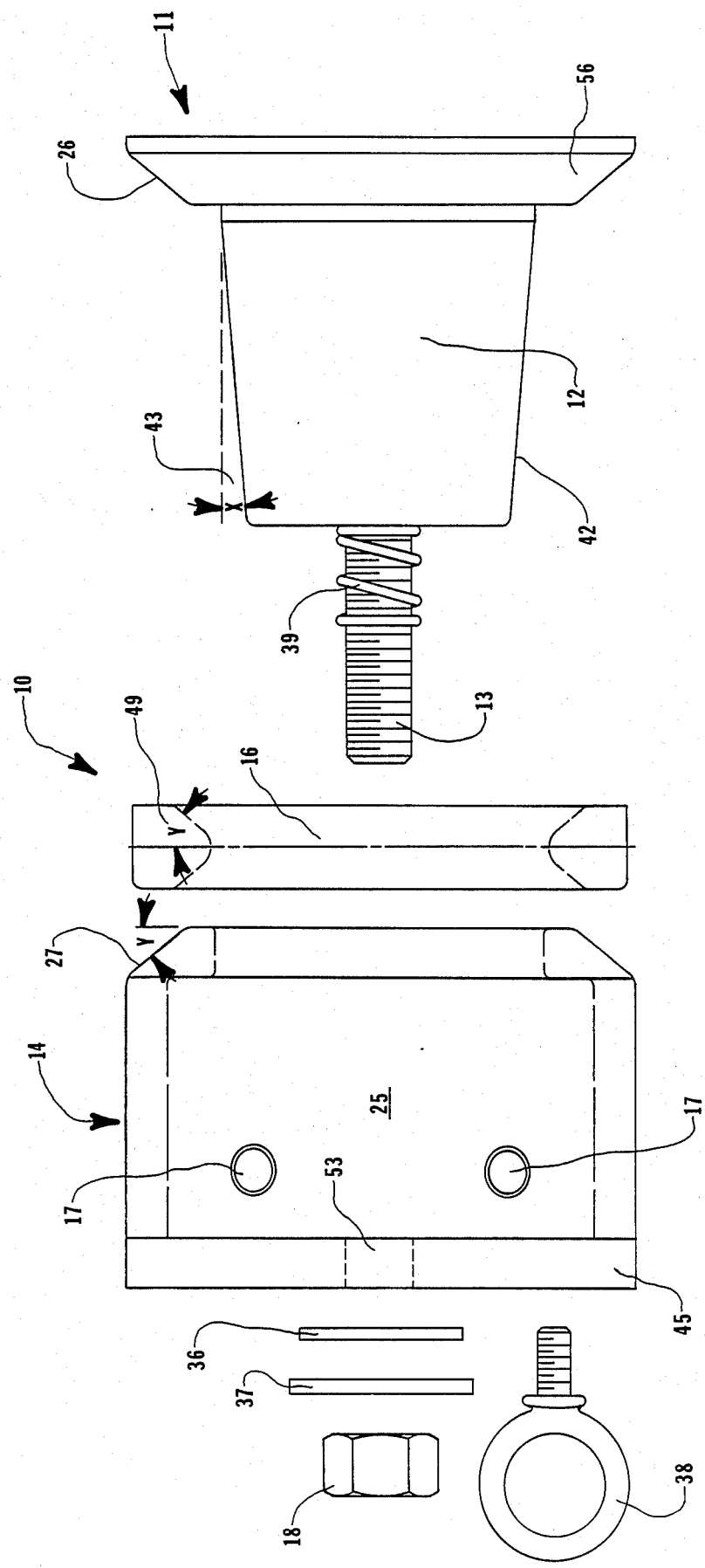
FIG. 3 is a lateral plan view of the high pressure mechanical plug device and showing the cooperating elements of the mechanical plug in a separated manner for purposes of clarity.

Importantly, and as further shown in FIG. 3, the cylindrical body 25 has a plurality of apertures 17 through which the locking pins 15 extend. Each locking pin 15, as further shown in FIG. 5, is of a button pin design which has a rounded bottom portion 23 for sliding engagement on the sloping surface 42 of ram 12. Each locking pin 15 has a compression spring 41 located between its bottom 23 and the interior wall of the cylindrical body 25 of the top plate structure 14. Thus, as the ram 12 protrudes into the cylindrical body 25, the locking pins 15 are forced through the apertures 17 to permit the cupped points 19 of the pins 15 to engage and mechanically lock into the interior wall of the pipeline.

Figure 2:
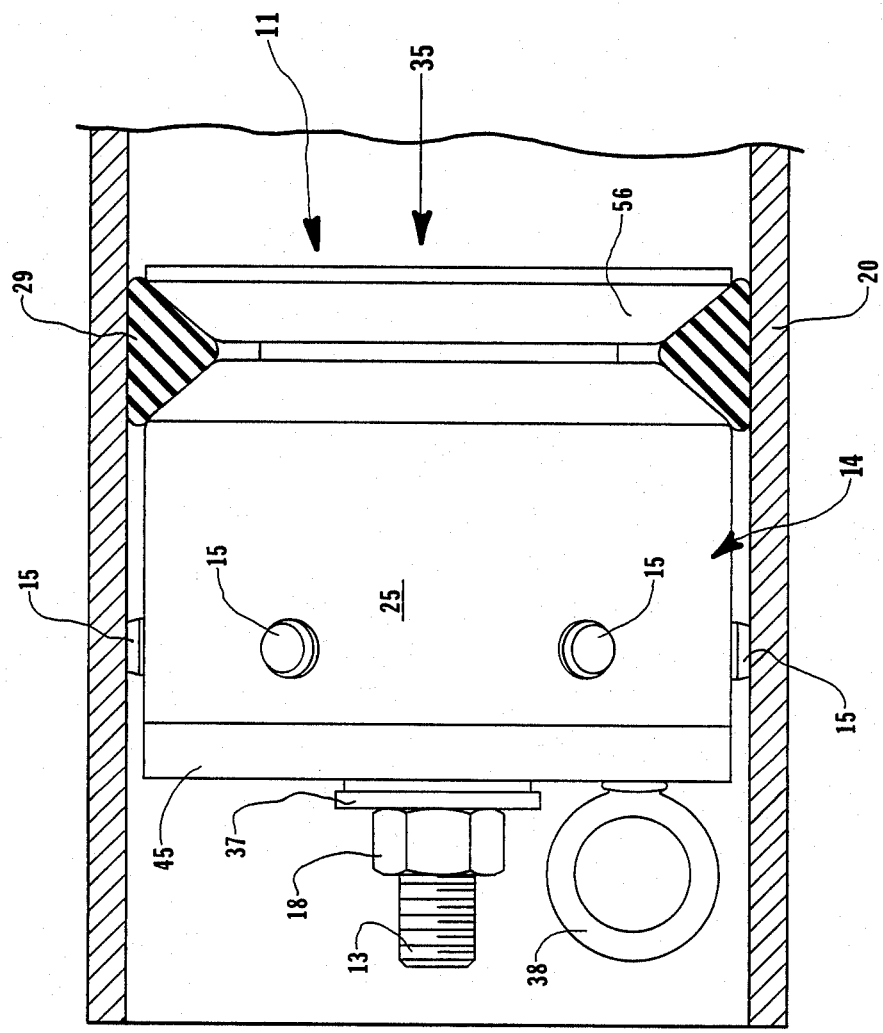
FIG. 2 is a lateral plan view showing the high pressure mechanical plug device of this invention in an operative position sealing and locking into the interior of a pipeline.

FIG. 2 shows a high pressure mechanical plug 35 in a sealing position in pipeline 20 and particularly showing the pins 15 engaging the pipeline interior wall. The mechanical plug 35 is shown to use a triangular cross-sectional sealing ring 29 which has a V-shaped bottom portion of a predetermined angle. As the pentagonal shaped sealing ring 16 shown in FIG. 1, the important feature of these sealing rings is their V-shaped bottom portions. As further shown in FIG. 3, the angle "Y" or 49 is measured vertically through the apex of the sealing ring as one would slice a bagel or muffin. The sloped surfaces of the V-shaped portion of the sealing members engage and slide on the opposing ramps or sloped surfaces 26 and 27 of the bottom and top plate structures. The sloped surfaces 26 and 27 are preferably of the same predetermined angle "Y" as that of the V-shaped bottom portion of the sealing ring. It has been found that an angle "Y" ranging between 35 and 60 degrees is suitable for the proper functioning of these high pressure plug devices in pipelines ranging from 1.5 to 18 inches in diameter.

The key to this invention is that the mechanical plug 35 seals and grips the pipeline interior surface by means of an elastomeric O-ring 16 or 29 as well as by locking pins 15. Thus, while the O-rings 16 or 29 seal against leakage, the locking pins 15 mechanically grip and lock the mechanical plugs 10 and 35 in the pipeline 20.

The mechanical plug 10 is further shown in FIG. 1 to have a spring 39 positioned about draw bolt 13 and further positioned between the ram section 12 and an indentation in the inner wall of the end plate 45. Thus, as the nut 18 is loosened after use of the device 10, the ram section 12 is forced outward from the top plate structure 14 and causing the compression springs 41 to retract the locking pins 15. Although the device 10 is shown to utilize six equadistantly spaced locking pins 15, it has been found that at least three such locking pin structures are preferred.

As further shown in FIG. 3, the bottom plate 11 is shown to be unitary in structure to include the end wall 56 and ram 12 having the draw bolt 13 extending therefrom. The ram 12 provides a means on which the locking pins 15 ride when the plug 10 is operated. Thus, as the nut 18 is tightened on draw bolt 13, the locking pins 15 protrude through apertures 17 to engage the interior of pipeline 20. As shown, the ram 12 has a sloped surface 42 having an angle "X" at 43. It has been found that an angle "X" ranging between 3 and 15 degrees is suitable for the operation of the high pressure mechanical plug 10 of this invention. The preferred angle "X" being approximately 5 degrees. This angle range of the sloped surface of ram 12 has been found to cooperate with the angle "Y" range discussed above with respect to the V-shaped sealing rings 16 and 29.

It has also been found important to have the sloping surface 42 of the ram 12 hardened to approximately a Rockwell 50–65 C reading. Additionally, the bottom portions 23 and the cupped points 19 of the locking pins 15 are preferably hardened to this same Rockwell C range.

FIG. 4 shows a high pressure mechanical plug 40 embodiment which uses toothed cam structures 21 rather than the locking pins 15 discussed above. The mechanical plug device embodiment 40 preferably has the same number of cam structures 21 as embodiment 10 has locking pin structures 15. Each cam structure 21 is pivotally mounted at 22 in the wall of the cylindrical body 44. Spring 55 is shown in communication with the pivot member 22, the toothed cam structure 21 and the cylindrical body 44. The spring 55, as compression spring 41 on button pin 15, functions to keep the cam structure 21 retracted into aperture 50 and in communication with the sloped surface 42 of the ram structure 12.

The rounded bottom 28 of each toothed cam 21 rides on the sloped surface 42 of ram 12. The toothed cam 21 has serrated edges or teeth 34 for gripping the interior wall of the pipeline surface to thereby lock the plug 40 in place. The lower, rounded cam surface 28 and the serrated top surface 34 are also hardened to a Rockwell C range of 50–65.

The high pressure mechanical plug embodiment 40 also is shown to have a different bottom plate or piston structure 24. The bottom plate 24, although having an end wall 57 similarly attached to ram 12 by means of screws 30 and the utilization of sealing ring 48, has an exterior circumferential groove 54 on end wall 57 in which a compression sealing ring 33 is utilized. The compression sealing ring 33 has an outside diameter larger than that of the remaining device structure 40 so that it engages the interior of the pipeline wall in a manner similar to piston rings. Although one such compression ring 33 is shown, the end wall 57 of the bottom plate structure 24 can be equipped with a plurality of such sealing rings. Additionally, the compression rings 33 can have a cross-section other than a circular one. The important feature of the compression ring 33 being its touching engagement with the bottom plate structure 24 and the interior wall of the pipeline.

Further shown in the embodiment 40 of FIG. 4, is a spring 39 placed about draw bolt 13. The spring 39 permits the plug device 40 to expand axially after use when the nut 18 is loosened to, thereby, cause the toothed cam structures 21 to unlock from the pipeline wall. Additionally, an eye bolt 38 is provided as a tethering means for the plug device 40. The eye bolt 38 is shown fixed to the end plate 45 of top plate structure 14.

FIG. 5 shows further details of the locking pin 15. The locking pin 15 preferably has a rounded bottom for riding on the ram 12 and a cup point 19 for engaging the interior wall of the pipeline. Additionally, the pin 15 has a compression spring 41 which keeps the pin in contact with the sloped surface 42 of ram 12.

In the mechanical plug device 10, the top plate and bottom plate structures 14 and 11 are constructed of aluminum, carbon steel or stainless steel. The rigid securement members of the devices may also be constructed of these materials. The elastomeric sealing members 16, 29 and 33 are constructed of elastomeric materials, such as plasticized polyvinyl chloride, natural rubber, synthetic rubber, polyurethane, fluoroelastomers, nitrile, neoprene, teflon and silicone. The synthetic rubber compounds include poly-isoprene, polychloroprene, synthetic poly-isoprene and polysiloxane. Other elastomeric materials may also be used to construct the elastomeric sealing members depending upon environmental considerations.

In operation with respect to embodiment 10, as the nut 18 is tightened on draw bolt 13, the movement of bottom plate 11 and ram 12 causes the elastomeric O-ring 16 to expand for sealing the pipeline and the locking pins 15 or toothed cams 21 to protrude through the side apertures 17 and 50, respectively, of the cylindrical bodies 25 and 44 for locking the mechanical plug 10 into the pipeline. The internal pressure of the pipeline additionally causes the bottom plate structures to be forced into the top plate structures to, thereby, further exert axial pressure by the ram section on the locking pins 15 or cam structures 21. Thus, the internal pressure of the pipeline causes the mechanical plug devices of this invention to lock in place. For example, an 8 inch pipeline having an internal pressure of 500 p.s.i. exerts an actuation pressure on the ram or piston structure in excess of 25,000 p.s.i. to lock the device in place.

As many changes are possible to the embodiments of this invention, utilizing the teachings thereof, the description above, and the accompanying drawings should be interpreted in the illustrative, and not in the limited sense.

We claim:

1. A mechanical plug device for sealing and locking into the interior of a high pressure pipeline and wherein said mechanical plug device is constructed and arranged to lock the plug device in the pipeline by utilizing the internal fluid pressure therein, said device comprising:
    (a) a top plate body structure having a circular cross-section having a generally hollow interior and having a plurality of laterally disposed apertures at predetermined locations;
    (b) a bottom plate structure having a central longitudinal axis and having an end wall of a circular cross-section for receiving the fluid pressure of the pipeline and further having a ram section of a predetermined slope extending axially therefrom for insertion and free movement into the hollow interior of said top plate body structure;
    (c) an elastomeric sealing member in communication with one said plate structures for sealing engagement with the interior of a pipeline;
    (d) a plurality of rigid locking members being constructed and arranged for generally the lateral movement with respect to said ram member and for extension through said laterally disposed apertures of said top plate body structure; and
    (e) means to move said bottom plate toward said top plate body structure without restricting the further free movement of said bottom plate toward said top plate, whereby the movement of said bottom plate structure into said top plate body structure causes said ram member to laterally push said rigid locking members through said top plate apertures for engagement with the pipeline wall to secure said mechanical plug therein and wherein the fluid pressure of the pipeline acts on said bottom plate structure end wall to further move said ram section with respect to said rigid locking members to further secure said device therein.

2. The mechanical plug device of claim 1, wherein said bottom plate structure further has an end wall having an exterior circumferential surface and having a circumferential grooved portion therein, and wherein said elastomeric sealing member is an O-ring for seating in said circumferential groove.

3. The mechanical plug device of claim 1, wherein said top plate body structure additionally has a beveled end portion, and wherein said bottom plate structure additionally has an end wall having a beveled end portion adjacent said sloping ram section, and wherein said elastomeric sealing member is a V-shaped O-ring member for placement between said beveled portions of said bottom plate and said top plate structures, whereby the movement of said bottom plate structure toward said top plate body structure causes said V-shaped O-ring to be expanded outwardly for sealing the interior of the pipeline.

4. The mechanical plug device of claim 1, wherein said rigid locking members are comprised of locking pin structures having indented circular head structures and having rounded bottom portions for engaging said ram member.

5. The mechanical plug device of claim 1, wherein said rigid locking members are toothed cam structures having serrated top portions and rounded bottom portions for slidingly engaging said sloping ram section surfaces, said toothed cam structures further being pivotally attached to said wall of said top plate structure.

6. The mechanical plug device of claim 1, wherein said means to move is comprised of a draw bolt extending centrally from said ram section of said top plate structure and a nut for threadingly engaging said draw bolt.

7. The mechanical plug device of claim 1, wherein said sloping ram section of said bottom plate structure is sloped downwardly at a predetermined angle ranging from 3 to 15 degrees with respect to a reference line parallel to said central longitudinal axis of said ram section.

8. The mechanical plug device of claim 1, wherein said sloping ram section and said rigid locking members are hardened to approximately a Rockwell 50 to 65 C reading.

9. The mechanical plug device of claim 3, wherein said V-shaped portions of said sealing ring have an angle range of 35 to 60 degrees as measured vertically through the apex thereof and wherein said mechanical plug device is constructed and arranged to seal high pressure pipelines having a nominal diameter range of 1.5 to 18 inches.

10. The mechanical plug device of claim 1, wherein said top plate, bottom plate and rigid locking member structures are constructed of aluminum, carbon steel or stainless steel.

11. The mechanical plug device of claim 1, wherein said elastomeric sealing member is comprised of a deformable elastomeric material selected from a group of materials consisting of plasticized polyvinyl chloride, natural rubber, synthetic rubber, polyurethane, fluoroelastomers, nitrile, neoprene, teflon and silicone.

12. The high pressure mechanical plug of claim 1, wherein said bottom plate structure end wall and said ram section are axially united and having a sealing ring therebetween and wherein said top plate structure has tethering means attached to the outside thereof.

13. A high pressure mechanical plug device for sealing a high interior pressure pipeline and wherein said mechanical plug device is constructed and arranged to lock the device in the pipeline utilizing the fluid pressure therein, said device comprising:
(a) a top plate body structure having a circular cross-section, a beveled end portion and a generally hollow interior, said top plate structure further having an axially aligned aperture therethrough and further having a plurality of laterally disposed apertures at predetermined locations therethrough;
(b) a bottom plate structure having a generally flat end wall of a circular cross-section, a beveled end portion facing opposite said end wall, a sloping ram section of a predetermined slope extending the same said direction as said beveled end and further having a threaded draw bolt extending from the central axis of said ram section;
(c) an elastomeric sealing member having a circular body with an inner V-shaped circumferential beveled portion for engaging the beveled end portions of said top plate and bottom plate structures;
(d) a plurality of rigid securement members constructed and arranged to ride on said sloping ram section and for extension through said lateral apertures in said top plate structure; and
(e) means to move said bottom plate structure toward said top plate structure, said moving means being operative on said threaded draw bolt and being constructed and arranged to permit the unrestricted free movement of said bottom plate toward said top plate, whereby said elastomeric sealing member is outwardly expanded on said beveled end portions of said bottom and top plate structures to seal the pipeline and, whereby, said rigid securement members are extended through said apertures of said top plate structure to engage the interior wall of the pipeline as said bottom plate structure is moved toward said bottom plate structure to secure said mechanical plug device therein.

14. The high pressure mechanical plug device of claim 13, wherein said sloping ram section of said bottom plate structure is sloped downwardly at a predetermined angle ranging between 3 to 15 degrees.

15. The high Pressure mechanical plug device of claim 13, wherein said securement member is comprised of a locking pin having an indented circular head structure and having a rounded bottom structure.

16. The high pressure mechanical plug device of claim 13, wherein said securement member is a toothed cam structure having a serrated top portion and a rounded bottom portion for riding on said sloping ram section surface.

17. The high pressure mechanical plug of claim 13 wherein said sloping ram section and said rigid securement members are hardened to approximately a Rockwell 50–65 C reading.

18. The high pressure mechanical plug device of claim 13, wherein said moving means is comprised of a nut for threading engagement on said draw bolt of said bottom plate structure.

19. The high pressure mechanical plug of claim 13 wherein said V-shaped portions of said sealing ring have an angle range of 35 to 60 degrees as measured vertically through the apex thereof and wherein said device is for sealing and locking into pipelines having diameters ranging from 1.5 to 18 inches.

20. The high pressure mechanical plug of claim 13, wherein said top plate, bottom plate and said rigid securement members are constructed of aluminum, carbon steel, or stainless steel.

21. The high pressure mechanical plug of claim 13, wherein said elastomeric sealing member is comprised of a deformable elastomeric material elected from a group of materials consisting of plasticized polyvinyl chloride, natural rubber, synthetic rubber, polyurethane, fluoroelastomers, nitrile, neoprene, teflon and silicone.

22. A mechanical plug device for sealing and locking into the interior of a high pressure pipeline and wherein said mechanical plug device is constructed and arranged to lock the device in the pipeline utilizing the fluid pressure therein, said device comprising:
(a) a generally hollow and rigid cylindrical body structure having an end wall and a side wall structure with a plurality of apertures;
(b) a piston structure having an end wall of generally the same diameter as said cylindrical body structure, said piston structure having a frustoconical ram of a predetermined slope extending axially from its end wall for movement into said cylindrical body structure;
(c) an elastomeric sealing member in communication with the end wall of said piston structure;
(d) a plurality of rigid securement members constructed and arranged for extension through said apertures in said cylindrical body structure and for slidingly engaging said frustoconical ram of said piston structure; and
(e) means to move said piston structure into said cylindrical body structure, said moving means being operative on said piston structure and being constructed and arranged to permit the further unrestricted movement of said frustoconical ram into said cylindrical body structure, whereby said piston structure movement results in the sealing and physical securement of said mechanical plug device in the pipeline as a result of said moving means and the internal fluid pressure of the pipeline.

23. The mechanical plug device of claim 22, wherein said frustroconical ram of said piston structure has a slope ranging between 3 and 15 degrees.

24. The mechanical plug device of claim 22, wherein said elastomeric sealing member is a compression ring fixed to the outer periphery of the end wall of said piston structure.

25. The mechanical plug device of claim 22, wherein said side wall structure and said end wall of said piston structure have frustoconical surfaces of a predetermined slope and wherein said elastomeric sealing member is constructed and arranged to communicate with said frustoconical surfaces.

26. The mechanical plug device of claim 22, wherein said elastomeric sealing member has a V-shaped bottom cross-section of generally the same said slope as said frustoconical surfaces.

27. The mechanical plug device of claim 26, wherein said device is for pipelines ranging in diameter from 1.5 to 18 inches and wherein said predetermined slope of said sealing member and said frustoconical surfaces range from 35 to 60 degrees.

* * * * *